United States Patent
Unger et al.

(10) Patent No.: US 9,963,007 B2
(45) Date of Patent: May 8, 2018

(54) METHOD FOR COMPENSATING FOR AN INCLINATION

(71) Applicant: AUDI AG, Ingolstadt (DE)

(72) Inventors: Andreas Unger, Gaimersheim (DE); Christoph Göhrle, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 15/554,126

(22) PCT Filed: Jan. 14, 2016

(86) PCT No.: PCT/EP2016/000061
§ 371 (c)(1),
(2) Date: Aug. 28, 2017

(87) PCT Pub. No.: WO2016/134811
PCT Pub. Date: Sep. 1, 2016

(65) Prior Publication Data
US 2018/0037082 A1    Feb. 8, 2018

(30) Foreign Application Priority Data
Feb. 28, 2015   (DE) .......................... 10 2015 002 603

(51) Int. Cl.
*B60G 17/0165*    (2006.01)
*B60G 17/019*    (2006.01)

(52) U.S. Cl.
CPC ... *B60G 17/0165* (2013.01); *B60G 17/01908* (2013.01); *B60G 2400/10* (2013.01);
(Continued)

(58) Field of Classification Search
CPC .................... B60G 17/0165; B60G 17/01908
See application file for complete search history.

(56) References Cited

U.S. PATENT DOCUMENTS

| 4,770,438 A | 9/1988 | Sugasawa et al. |
| 5,013,067 A | 5/1991 | Mine et al. |
| | | (Continued) |

FOREIGN PATENT DOCUMENTS

| DE | 102004019928 A1 | 11/2005 |
| DE | 102006026937 A1 | 1/2007 |
| | (Continued) | |

OTHER PUBLICATIONS

Notification of Transmittal of Translation of the International Preliminary Report on Patentability dated Sep. 14, 2017, in connection with corresponding International Application No. PCT/EP2016/000061 (11 pages).

(Continued)

*Primary Examiner* — Michael D Lang
(74) *Attorney, Agent, or Firm* — Maier & Maier, PLLC (57) ABSTRACT

A method for compensating for an inclination of a vehicle in at least one spatial direction. The vehicle has a vehicle body and an active chassis with a plurality of wheels, which are in contact with the roadway. Each wheel is joined to the vehicle body by way of an actuator, which can be adjusted in terms of its length, at a suspension point associated with the wheel. An inclination of the vehicle body in the at least one spatial direction is determined. For at least two wheels, respectively, a vertical distance to the suspension point of the vehicle body that is associated with the particular wheel is detected. Via the at least two determined distances, an inclination of the chassis in the at least one spatial direction is calculated by transformation of the vertical distance of the at least two wheels to the vehicle body.

11 Claims, 4 Drawing Sheets

(52) U.S. Cl.
CPC .... *B60G 2400/252* (2013.01); *B60G 2500/32* (2013.01); *B60G 2800/019* (2013.01); *B60G 2800/702* (2013.01)

(56) References Cited

U.S. PATENT DOCUMENTS

| | | |
|---|---|---|
| 8,170,726 B2 | 5/2012 | Chen et al. |
| 2014/0309803 A1 | 10/2014 | You et al. |

FOREIGN PATENT DOCUMENTS

| | | |
|---|---|---|
| DE | 102009014747 A1 | 12/2010 |
| DE | 102012216205 A1 | 3/2013 |
| DE | 102012024984 A1 | 7/2013 |
| EP | 0925967 A2 | 6/1999 |
| GB | 2391327 A | 2/2004 |
| GB | 2510417 A | 8/2014 |
| JP | 2003097945 A | 4/2003 |
| JP | 2009276109 A | 11/2009 |
| WO | 0220318 A1 | 3/2002 |

OTHER PUBLICATIONS

Examination Report dated Jan. 26, 2016 of corresponding German application No. 102015002603.8; 7 pgs.
International Search Report and Written Opinion dated Apr. 22, 2016 of corresponding International application No. PCT/EP2016/000061; 7 pgs.

METHOD FOR COMPENSATING FOR AN INCLINATION

FIELD

The invention relates to a method and a system for compensating for an inclination of a body of a vehicle.

BACKGROUND

The position of a vehicle changes during travel as a function of the inclination or position of a road that is traveled by the vehicle. Angles for registering the position of the vehicle can be recorded by sensors.

A method for controlling a system of a vehicle is described in the published document DE 10 2006 026 937 A1. A stability index is determined in this publication. Moreover, a first and a second observer are provided, who, on the basis of operating variables of the vehicle, determine a reference lateral speed as well as a lateral speed, from which an initial lateral speed as well as an initial longitudinal speed are determined.

A method for determining a target value for the curve inclination of a vehicle, when a curved section of a roadway is traveled, is known from the published document DE 10 2012 024 984 A1. The target value of the curve inclination of the vehicle is thereby determined as a function of a detected curvature of the roadway. Moreover, an optical surface condition of the curved section of the roadway is taken into account.

A method for the processing of sensor data in a vehicle is described in the published document DE 10 2012 216 205 A1, wherein vehicle dynamics and chassis sensor data of the vehicle are detected and filtered.

In addition, a method for identifying a downgrade or upgrade slope situation for a vehicle is known from the published document DE 10 2004 019 928 A1.

SUMMARY OF THE DISCLOSURE

Against this background, a method and a system with the features of the disclosure are proposed.

The method according to the invention is provided for compensating for an inclination of a vehicle, which travels an inclined roadway, in at least one spatial direction. The vehicle has a vehicle body and an active chassis with a plurality of wheels that are in contact with the roadway. Each wheel is joined to the vehicle body via an actuator, which can be adjusted in the vertical direction in terms of its length in relation to the vehicle body, at a suspension point associated with the wheel. In the method, first of all, an inclination of the vehicle body in the at least one spatial direction is determined, wherein, for at least two wheels, a vertical distance to the suspension point associated with the respective wheel of the vehicle body is recorded in each instance. By way of the determined distances, an inclination of the chassis in the at least one spatial direction is calculated by transformation of the vertical distance of the at least two wheels to the vehicle body by using a transformation matrix:

$$T = \begin{bmatrix} l_v & l_v & -l_h & -l_h \\ t_v & -t_v & t_h & -t_h \end{bmatrix}$$

Moreover, the inclination of the roadway in the at least one spatial direction is determined from a difference of the inclination of the vehicle body in the at least one spatial direction and the inclination of the chassis in the at least one spatial direction. Based on this, a value is determined in each instance for at least one angle $\phi_s$ as an angle of roll and/or $\theta_s$ as an angle of pitch, by which the roadway is inclined in the at least one spatial direction. Furthermore, a limit value $\phi_{s,lim}$, $\theta_{s,lim}$, respectively, for the value of the at least one angle $\phi_s$, $\theta_s$, is predetermined. In addition to this, translation ratios $i_{VA}$, $i_{HA}$ for a distance of the at least one actuator in relation to the vehicle body and for a distance of the at least one wheel in relation to the vehicle body are taken into account. A target value for a change in the length of the at least one actuator for compensating for the inclination is determined by:

$$\vec{z}_{act} = \mathrm{diag}(i_{VA}, i_{VA}, i_{HA}, i_{HA}) T^T \begin{bmatrix} \phi_{s,lim} \\ \theta_{s,lim} \end{bmatrix}$$

The inclination of the chassis in the at least one spatial direction is determined by transformation of the vertical distances of the at least two wheels to the vehicle body by using the transformation matrix:

$$T = \begin{bmatrix} l_v & l_v & -l_h & -l_h \\ t_v & -t_v & t_h & -t_h \end{bmatrix}$$

A front, longitudinal length $l_v$ hereby defines a distance of a particular front wheel from a center of gravity of the vehicle body in the longitudinal spatial direction. A rear, longitudinal length $l_h$ gives the distance of a particular rear wheel from the center of gravity in the longitudinal spatial direction. A front, transverse length $t_v$ gives the distance of the particular front wheel from the center of gravity in the transverse spatial direction. A rear, transverse length to gives the distance of the particular rear wheel from the center of gravity in the transverse spatial direction.

In the design, the translation ratios $i_{VA}$, $i_{HA}$ are calculated by way of a usually constant, measureable distance of a respective actuator from the center of gravity of the vehicle body and of a particular wheel from the center of gravity of the vehicle body. In the process, the lengths $l_v$, $l_h$, $t_v$, and $t_h$ are to be taken into account for distances of the wheels.

Usually or in accordance with definition, a negative angle of pitch $\theta_s$ is determined for the presence of an upward slope travel and a positive angle of pitch $\theta_s$ is determined for the presence of a downward slope travel.

The respective limit value $\phi_{s,lim}$, $\theta_{s,lim}$ for the value of the at least one angle $\phi_s$, $\theta_s$ of the inclination of the roadway is predetermined in the case of the angle of inclination by:

$$\phi_{s,lim} = \begin{cases} \phi_{s,max} & \text{if } \phi_s > \phi_{s,max} \\ \phi_{s,min} & \text{if } \phi_s < \phi_{s,min} \\ \text{otherwise } \phi_s \end{cases}$$

and in the case of the angle of pitch by:

$$\theta_{s,lim} = \begin{cases} \theta_{s,max} & \text{if } \theta_s > \theta_{s,max} \\ \theta_{s,min} & \text{if } \theta_s < \theta_{s,min} \\ \text{otherwise } \theta_s \end{cases}$$

As a rule, a value of $\theta_{s,min}$ in the case of upward slope travel is chosen to be greater than a value of $\theta_{s,max}$ in the case of downward slope travel.

In the scope of the method, for the determination of the inclination of the vehicle body, a first coordinate system that is fixed relative to the vehicle body is used, and, for the determination of the inclination of the chassis, a second, chassis-fixed coordinate system is used. A third, inertial coordinate system is used as a reference coordinate system, which is defined in relation to the force of gravity.

In the design, the inclination of the vehicle body in relation to the reference coordinate system is described via a quaternion.

Moreover, it is possible to use a strapdown algorithm, with which it is provided that, for the determination of a corrected acceleration of the vehicle, an acceleration measured by sensor is corrected by a centrifugal acceleration and by the gravitational acceleration. A velocity of the vehicle on a planar surface is determined from this and the inclination of the vehicle body is calculated.

The system according to the invention is designed for compensating for an inclination of a vehicle that travels on an inclined roadway in at least one spatial direction. The vehicle has a vehicle body and an active chassis with a plurality of, usually four, wheels, which are in contact with the roadway. The system has a plurality of sensors and a control unit. Each wheel is joined to the vehicle body via an actuator, which can be adjusted in terms of its length, at a suspension point associated with the wheel. At least one first sensor is designed for the purpose of determining an inclination of the vehicle body in the at least one spatial direction. At least one second sensor is designed for the purpose of recording, for at least two wheels, a vertical distance to the suspension point associated with the respective wheel of the vehicle body. The control unit is designed for the purpose of calculating, via determined distances of the at least two wheels, an inclination of the chassis in the at least one spatial direction by transformation of the vertical distance of the at least two wheels to the vehicle body by using a transformation matrix:

$$T = \begin{bmatrix} l_v & l_v & -l_h & -l_h \\ t_v & -t_v & t_h & -t_h \end{bmatrix}$$

Moreover, the control unit is designed for the purpose of determining the inclination of the roadway in the at least one spatial direction from a difference of the inclination of the vehicle body in the at least one spatial direction and the inclination of the chassis in the at least one spatial direction and of determining, in each instance, a value for at least one angle $\phi_s$, $\theta_s$ by which the roadway is inclined in the at least one spatial direction. In addition, it is provided that, in each instance, a limit value $\phi_{s,lim}$, $\theta_{s,lim}$ for the value of the at least one angle $\phi_s$, $\theta_s$ is predetermined. The control unit is, in addition, designed for the purpose of taking into account translation ratios $i_{VA}$, $i_{HA}$ for a distance of the at least one actuator in relation to the vehicle body and for a distance of the at least one wheel in relation to the vehicle body. Furthermore, the control unit is designed for the purpose of determining a target value for a change in a length of the at least one actuator by way of:

$$\vec{z_{act}} = \text{diag}(i_{VA}, i_{VA}, i_{HA}, i_{HA})T^T \begin{bmatrix} \phi_{s,lim} \\ \theta_{s,lim} \end{bmatrix}$$

The at least one second sensor is designed as a distance sensor, by means of which a distance of a particular wheel to the vehicle body is to be determined. In an embodiment, the actuators, which can be adjusted in terms of their length, are also designed as components of the system.

By means of the method and the system, it is possible to achieve a check and accordingly a regulation and/or control of the horizontal leveling or of the horizontal alignment of the vehicle body of the vehicle for upward slope travel as well as for downward slope travel on a roadway to be traveled, but also when a lateral inclination of the roadway exists. In accordance therewith, lengths of the actuators of the active chassis of the vehicle are adjusted by the target values and compensated for by alignment of the inclination of the vehicle body to $\vec{z_{act}}$ the inclination of the roadway. In the process, it needs to be identified, first of all, whether the vehicle is traveling on an upward slope and accordingly on an uphill oriented roadway or else on a downward slope and accordingly on a downhill oriented roadway. Based on this, an action for horizontal alignment of the vehicle body is taken, wherein, in the case of upward slope travel at a negative angle of pitch, a stronger horizontal alignment of the vehicle body is made than in the case downward slope travel at a positive angle of pitch. Accordingly, in the case of downward slope travel, the inclination of the roadway is to be compensated for to a lesser extent than in the case of upward slope travel.

In the case of an upward slope, the vehicle is raised at the rear by the actuators and lowered at the front, as a result of which a better view and an increased comfort is achieved for occupants of the vehicle. In contrast to this, in the case of downward slope travel, the vehicle is raised at the front by the actuators and lowered at the rear, usually to a lesser extent, however, than in the case upward slope travel in order not to impair the view of the occupants and in order to ensure a ground clearance of the vehicle during a transition from upward slope travel or downward slope travel to the horizontally oriented roadway. Accordingly, the occupants of the vehicle can sit up straighter and, in the case of inclined roadways, need to support themselves less strongly in the cabin of the vehicle. Usually, the view for the driver is markedly improved.

In the scope of the method, the angle of pitch and/or the angle of roll of the vehicle body of the vehicle in relation to the inertial coordinate system is estimated. At least one of these angles gives the inclination of the vehicle body in relation to the horizontal, which is defined via the axes in the spatial directions $x_{ref}$, $y_{ref}$, $z_{ref}$ of the inertial coordinate system. Via the distance sensors, such as, for example, the wheel deflection sensors, the angle of the roadway in the direction of pitch and roll of the vehicle is determined—usually calculated—from the angles of the vehicle body in the inertial coordinate system. On the basis of the value and sign of the respective angle, it is identified whether the vehicle is situated on a slope and whether what is involved is upward slope travel or downward slope travel.

A negative angle of pitch indicates upward slope travel, whereas a positive angle of pitch indicates downward slope travel. The determined angle of pitch of the vehicle body is converted into a feedforward control, wherein, when there is a positive angle of pitch, the two front actuators of the chassis are extended and the two rear actuators retracted. In contrast to this, when a negative angle of pitch is identified, the front actuators of the chassis are retracted and the two rear actuators are extended.

In order to achieve that, in the case of downward slope travel, the vehicle body is not aligned so strongly horizontally, the calculated angle of pitch in the inertial system is limited, so that, for the angle of pitch for correction or compensation of the inclination of the vehicle body, no negative values that are too large are obtained as result for the angle of pitch and, accordingly, no horizontal alignment that is too strong ensues during downward slope travel or downgrade travel.

The mentioned procedures are to be implemented for forward drive of the vehicle. For reverse drive, either no alignment of the vehicle body or at most a horizontal alignment of the vehicle body or a reverse change of a length of the actuators in relation to forward drive is provided. If upward slope travel in reverse is to be carried out, a stronger horizontal alignment is implemented. If downward slope travel in reverse is to be carried out, only a minor horizontal alignment needs to be achieved in order to afford the occupants a good view.

Additionally or alternatively, in an embodiment, in the case of a horizontal alignment of the vehicle body for upward or downward slope travel, a horizontal alignment is implemented when there is lateral inclination of the roadway. In accordance therewith, for compensation of an inclination of the vehicle body in relation to the inertial coordinate system, an adjustment of the respective lengths of the actuators is to be combined with consideration of an angle of pitch and angle of roll. For compensation of a lateral inclination as inclination in terms of an angle of roll, the procedure to be followed is analogous to the case of the angle of pitch. In accordance therewith, a feedforward control for the actuators is calculated from the angle of roll in relation to the inertial coordinate system, with no distinction being made between a lateral inclination to the left or to the right. In this case, a value of $\theta_{s,max}$ is usually just as large as a value of $\theta_{s,min}$.

Regardless of which angle, that is, the angle of pitch and/or the angle of roll, in which direction is taken into account, a compensation for the inclination of the roadway is to be implemented with the active chassis.

In a possible implementation of the method, a respective angle and accordingly the angle of pitch and/or the angle of roll of the vehicle, usually of the vehicle body of the vehicle, are or is determined in relation to the inertial coordinate system in the direction of pitch and/or in the direction of roll and differentiated via the sign of the angle between upward slope travel and downward slope travel or, for a roadway inclined in the lateral inclination direction, between an inclination to the left or to the right. In the process, it is also possible to compensate for the direction of pitch and the direction of roll in combination. Any possibly existing inclination of the vehicle body is to be compensated for in relation to the inertial coordinate system and accordingly in relation to a horizontal plane, which is aligned and/or defined via the Earth's field of gravity.

In the scope of the method, in order to align the vehicle body of the vehicle to the horizontal—or horizontally—it is not absolutely essential to align said vehicle body exactly parallel to the horizon. A measure of a horizontal alignment that needs to be made is to be determined in the embodiment in an applicable manner and hence defined. A measure of this kind is to be chosen depending, for example to 50%, on an initial position of the vehicle body parallel to the horizon. The measure for the inclination can be adjusted via the limit values $\phi_{s,lim}$, $\theta_{s,lim}$.

BRIEF DESCRIPTION OF THE DRAWINGS

Further advantages and embodiments of the invention ensue from the description and the appended drawings.

It is obvious that the features mentioned above and to be discussed below can be used not only in the combination given in each instance, but also in other combinations or alone, without departing from the scope of the present invention.

The invention is illustrated schematically in the drawings on the basis of embodiments and will be described schematically and in detail with reference to the drawings.

The figures are described in a coherent and overall manner, where identical reference numbers refer to the same components.

DETAILED DESCRIPTION OF THE DRAWINGS

Figure 1:
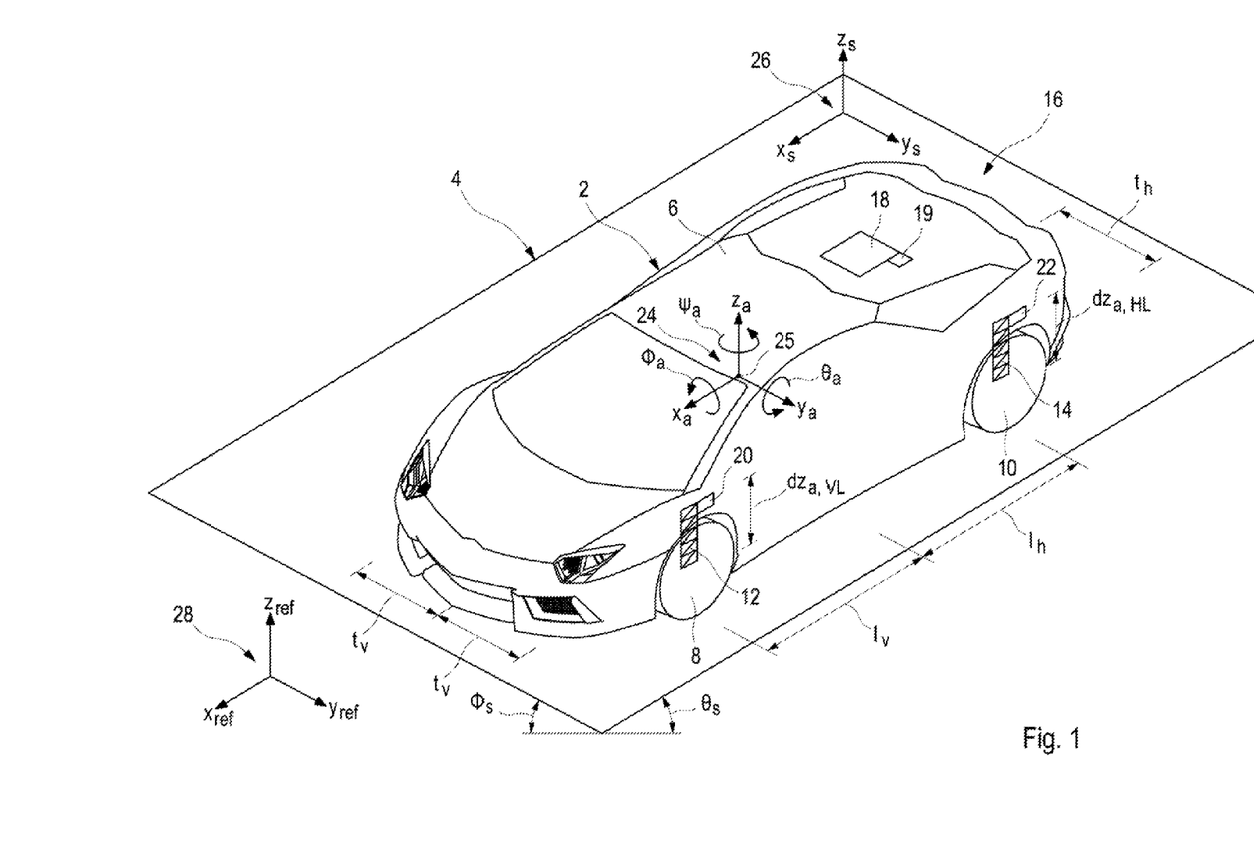
FIG. 1 shows, in schematic illustration, an example for a vehicle with an embodiment of the system according to the invention.

Illustrated schematically in FIG. 1 are a vehicle 2, constructed as a vehicle, and a roadway 4, constructed as a street, on which the vehicle 2 moves when traveling. In this case, the vehicle 2 comprises a vehicle body 6 and four wheels 8, 10, which are provided for locomotion of the vehicle 2 and of which only a front left wheel 8 and a rear left wheel 10 are shown in FIG. 1. Each wheel 8, 10 is joined to the vehicle body 6 via at least one active actuator 12, 14, wherein the wheels 8, 10 and the actuators 12, 14 are designed as components of an active chassis of the vehicle 2.

The embodiment of the system according to the invention 16 comprises, as components, a control unit 18, at least one first sensor 19 for determination of the inclination of the vehicle body 6, and a plurality of—in this case, four—second sensors, designed as distance sensors 20, 22, only two of which are illustrated in FIG. 1, wherein a distance sensor 20, 22 of this kind is associated with each wheel 8, 10. The at least one first sensor 19 and the distance sensors 20, 22 are designed, at the same time, as components of a sensor arrangement of the system 16. Furthermore, the sensor arrangement and accordingly the system 16 comprise sensors, which are not illustrated further, for determination—as a rule, for measurement—of at least one kinetic variable, usually a velocity and/or acceleration, of the vehicle 2 and/or of the vehicle body 6.

Figure 2:
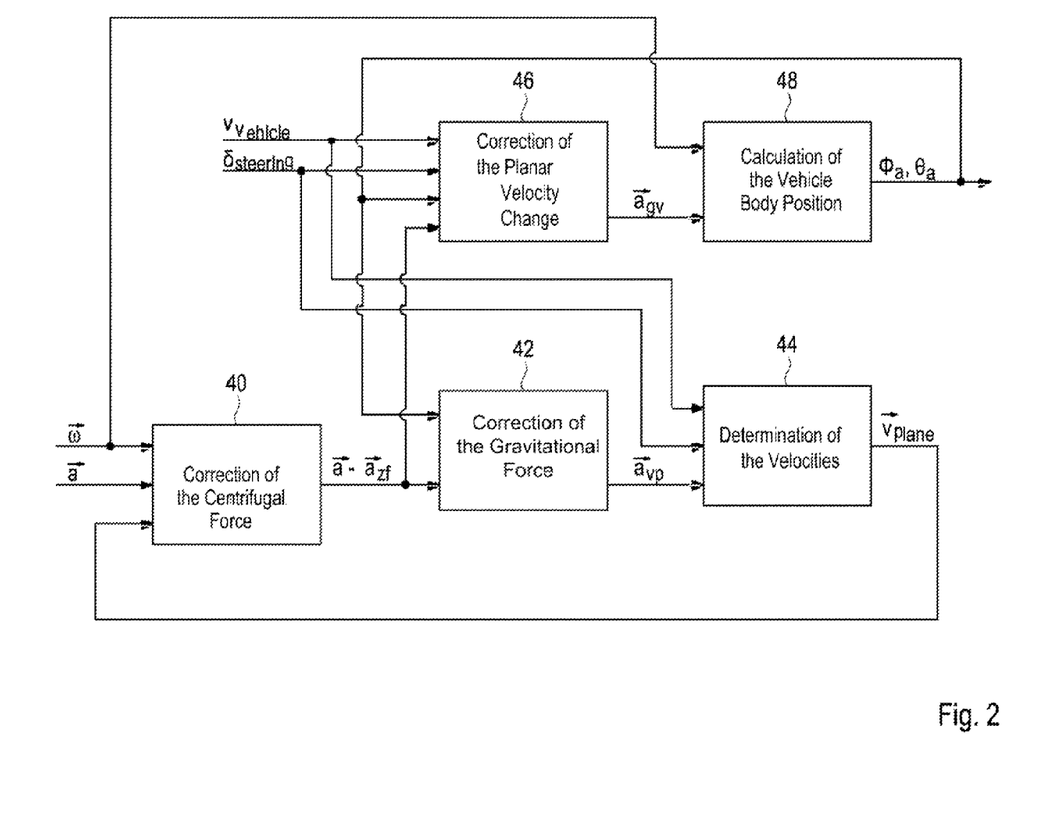
FIG. 2 shows a diagram relating to an embodiment of the method according to the invention.

The embodiment of the method according to the invention described below on the basis of, among other things, the diagram of FIG. 2 is to be implemented with the embodiment of the system according to the invention 16 illustrated schematically in FIG. 1, wherein steps of the embodiment of the method are to be checked by the control unit 18 and accordingly controlled and/or regulated.

Moreover, three coordinate systems 24, 26, 28 as well as diverse—in this case, geometric—parameters are illustrated in FIG. 1.

In this case, a first, vehicle body-fixed coordinate system 24 is associated with the vehicle body 6 of the vehicle 2, with its origin lying at the center of gravity 25 of the vehicle body 6. The first coordinate system 24 comprises a first axis in the spatial direction $x_a$, which is oriented longitudinally to the vehicle body 6 as well as parallel to a direction of travel of the vehicle 2. A second axis is oriented in the spatial direction $y_a$ transversely to the vehicle body 6 as well as parallel to the axes of the vehicle 2 that extend between each two wheels 8, 10 of the vehicle 2. A third axis is oriented in the spatial direction $z_a$ parallel to a vertical axis of the vehicle body 6. All three mentioned axes and accordingly spatial directions $x_a$, $y_a$, $z_a$ are oriented perpendicularly to one another. In this case, it is provided in an embodiment that the two first-mentioned axes and accordingly the spatial directions $x_a$ and $y_a$ span a horizontal plane of the vehicle 2 in which the center of gravity 25 lies.

Furthermore, FIG. 1 shows two examples of vertically oriented distances $dz_{a,VL}$, $dz_{a,HL}$. A first distance $dz_{a,VL}$ relates to a distance between the front left wheel 8 and the vehicle body 6. A second distance $dz_{a,HL}$ relates to a distance between the rear left wheel 10 and the vehicle body 6. These distances $dz_{a,VL}$ $dz_{a,HL}$ are oriented along the actuators 12, 14 and are recorded by the distance sensors 20, 22 associated with the wheels 8, 10.

The distances of the wheels 8, 10 from the center of gravity 25 of the vehicle body 6 in a plane parallel to the horizontal plane are to be defined here via the lengths or side lengths $t_v$, $t_h$, $l_h$, $l_v$. In this case, for the front left wheel 8, a front, transverse length $t_v$, which gives the distance of the wheel 8 from the center of gravity 25 in the transverse spatial direction, and a front, longitudinal length $l_v$, which gives the distance of the wheel 8 from the center of gravity 25 in the longitudinal spatial direction, are to be taken into account. For the rear left wheel 10, a rear, transverse length $t_h$, which gives the distance of the wheel 10 from the center of gravity 25 in the transverse spatial direction, and a rear, longitudinal length $l_h$, which gives the distance of the wheel 10 from the center of gravity 25 in the longitudinal spatial direction, are to be taken into account.

A further vertically oriented distance $dz_{a,VR}$ relates to a distance between a front right wheel, which is not shown here, and the vehicle body 6. An additional distance $dz_{a,HR}$ in vertical direction relates to a distance between a rear right wheel, which is not shown here, and the vehicle body 6. The described distances $dz_{a,VL}$, $dz_{a,HL}$, $dz_{a,VR}$, $dz_{a,HR}$ or distances between the wheels 8, 10 and the vehicle body 6 are given in the embodiment in relation to the horizontal plane, in which the center of gravity 25 lies.

Furthermore, for the front right wheel, the first, transverse length $t_v$, which gives the distance of the front right wheel from the center of gravity 25 in the transverse spatial direction, and the front, longitudinal length $l_v$, which gives the distance of the front right wheel from the center of gravity 25 in the longitudinal spatial direction, are to be taken into account. For the rear right wheel, the rear, transverse length $t_h$, which gives the distance of this wheel from the center of gravity 25 in the transverse spatial direction, and the rear, longitudinal length $l_h$, which gives the distance of the rear right wheel from the center of gravity 25 in the longitudinal spatial direction, are to be taken into account, wherein, in FIG. 1, the rear, transverse length that is to be taken into account for the rear right wheel is not drawn.

A second, chassis-fixed coordinate system 26 is associated with the roadway 4 and comprises a first axis in the spatial direction $x_s$ parallel to an intended direction of travel or longitudinal direction of the roadway 4, a second axis in the spatial direction $y_s$, which is oriented parallel to a lateral direction of the roadway 4, and a third axis in the spatial direction $z_s$, wherein all mentioned axes are oriented perpendicularly to one another. An inclination and accordingly a position of the roadway 4 is to be defined here on the basis of a lateral angle or angle of roll $\phi_s$, which defines an inclination of the roadway 4 in the lateral direction, and on the basis of a longitudinal angle or angle of pitch $\theta_s$, which defines an inclination of the roadway 4 in the longitudinal direction and accordingly, for example, an upgrade or a downgrade.

A third coordinate system 28 is designed as a reference coordinate system and comprises a first axis in the spatial direction $x_{ref}$, a second axis in the spatial direction $y_{ref}$, and a third axis in the spatial direction $z_{ref}$ which are all oriented perpendicularly to one another.

Shown, moreover, are, for the first coordinate system 24, an angle of roll $\phi_a$, which defines a rotation of the vehicle body 6 around the first axis oriented in the spatial direction $x_a$, an angle of pitch $\theta_a$, which defines a rotation of the vehicle body 6 around the second axis in the spatial direction $y_a$, and an heading angle $\psi_a$, which defines a rotation of the vehicle body 6 around the third axis oriented in the spatial direction $z_a$.

The first coordinate system 24 [$x_a$, $y_a$, $z_a$], which is fixed to the vehicle body at the center of gravity 25 of the vehicle body 6 of the vehicle 2 follows translational and rotational movements of the vehicle body 6. The third, inertial coordinate system 28 [$x_{ref}$, $y_{ref}$, $z_{ref}$] is employed as a reference coordinate system, wherein it is taken into account that the gravitational acceleration g acts exclusively in the spatial direction $z_{ref}$ parallel to a gravitational vector.

In an embodiment of the method, for estimation of an inclination or a position of the vehicle body 6, the angle of pitch $\theta_a$ and the angle of roll $\phi_a$ are given in relation to the third coordinate system 28, designed as a reference coordinate system.

The angles [$\theta_a$, $\phi_a$, $\psi_a$] enclosed between the coordinate system 24 fixed to the vehicle body and the reference system or inertial coordinate systems 28 are also referred to as the inertial angle of pitch $\theta_a$, the inertial angle of roll $\phi_a$, and the inertial heading angle $\psi_a$. The orientation thereof in the direction of pitch and direction of roll is referred to as the inclination of the vehicle body 6, from which the angle of pitch $\theta_a$ and the angle of roll $\phi_a$ are determined.

In order to be able to estimate the inclination or position of the vehicle body 6, the acceleration $\vec{a} = [\ddot{x}_a, \ddot{y}_a, \ddot{z}_a]^T$ of the vehicle body 6 or of the vehicle 2 along the spatial directions $x_a$, $y_a$, $z_a$ and the rates of rotation $\vec{\omega} = [\dot{\psi}_a, \dot{\phi}_a, \dot{\Theta}_a]^T$ are measured and accordingly determined by using the sensor arrangement for determination of the inertia with six degrees of freedom (IMU, inertial measurement unit), wherein the sensor arrangement can also be employed independently of the implementation of the method in the vehicle 2.

For estimation of the inclination of the vehicle body 6, it needs to be taken into account, first of all, which physical boundary conditions are to be applied to the variables $\vec{a}$ and $\vec{\omega}$ that are to be determined by the sensor arrangement, for example, by way of measurement. From measurement signals of acceleration sensors of the sensor arrangement, three different physical variables are derived:

the centrifugal acceleration $\vec{a}_{zf}$, which depends on the rates of rotation $\vec{\omega}$ and the planar velocity $\vec{v}_{plane} = [v_{plane,x}, v_{plane,y}, v_{plane,z}]^T$ of the vehicle 2:

$$\vec{a}_{zf} = \vec{\omega} \times \vec{v}_{plane} \quad (3)$$

the change in the adjusted, planar velocity $\vec{v}_{plane}$ and accordingly acceleration $\vec{a}_{vp}$ of the vehicle 2 and/or of the vehicle body 6 in the spatial direction of an axis of a respective acceleration sensor in the horizontal plane of the vehicle:

$$\vec{a}_{vp} = R\vec{v}_{plane} \quad (4)$$

the gravitational acceleration $\vec{a}_{gv} = R[0,0,-g]^T$ (5)

In the above formulas, $\vec{v}_{plane}$ is the velocity of the vehicle 2 in the horizontal plane and R is Euler's rotation matrix (6), which is calculated taking into consideration Euler's angle in a rotation sequence of the angle of roll $\phi$, the angle of pitch $\theta$, and the heading angle $\psi$. In this case, $v_{plane,x}$ is the conventional velocity of the vehicle $v_{Vehicle}$ in the longitudinal direction or direction of travel of the vehicle 2, which is measured via a rotational velocity of the wheels 8, 10 and displayed on the tachometer.

$$R = \begin{pmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\cos\psi - \sin\phi\cos\psi & \cos\phi\cos\theta \end{pmatrix} \quad (6)$$

The angle $\phi$ that is to be determined respectively, that is, $\phi_a$ (for the vehicle body), $\phi_f$ (for the chassis), or $\phi_s$ (for the roadway), and $\theta$, that is, $\theta_a$ (for the vehicle body), $\theta_f$ (for the chassis), or $\theta_s$ (for the roadway), can usually be determined via two different methods of calculation or calculational approaches:

by time integration of the rates of rotation $\vec{\omega}$ measured by the sensor arrangement or by elimination of the centrifugal acceleration $\vec{a}_{zf}$ and the change in the planar velocity $\vec{v}_{plane}$ and accordingly the acceleration $\vec{a}_{vp}$ of the vehicle 2 from the accelerations measured by the sensor arrangement, $\vec{a}_{gv} = \vec{a} - \vec{a}_{zf} - \vec{a}_{vp}$, and calculation of the angles via trigonometric functions $$\theta_a = \mathrm{atan}\frac{a_{gv,x}}{a_{gv,z}}, \phi_a = \mathrm{atan}\frac{a_{gv,y}}{a_{gv,z}}.$$

As already indicated on the basis of Equation (5), $\vec{a}_{gv}$ is a vector with the three elements $[a_{gv,x}, a_{gv,y}, a_{gv,z}]^T = [g^*\sin\theta, -g^*\sin\phi^*\cos\theta, -g^*\cos\phi^*\cos\theta]^T$, where, in contrast, the gravitational acceleration g=9, 81 m/s² is used in this case as a scalar, which, depending on the inclination of the vehicle body 6, which is described by Euler's rotation matrix R (6), acts on different elements of the vector $\vec{a}_{gv}$. If the vehicle body 6 is not inclined, then $\vec{a}_{gv} = [0,0,-g]^T$. For an angle of roll $\phi_a=90°$ and an angle of pitch $\theta_a=0°$, $\vec{a}_{gv}=[0, -g, 0]^T$. If $\vec{a}_{gv}$ is known, then the angle of pitch $\theta_a$ and the angle of roll $\phi_a$ can be calculated via the above-described a tan functions.

However, it needs to be taken into account for the calculations that are to be carried out that, on account of time-variable offset errors of rates of rotation sensors, an integration of the rates of rotation in a stationary manner is not precise under circumstances. This means that calculated angles exhibit a low-frequency drift and only high-frequency portions of measurement signals can be used. In contrast to this, high-frequency interferences need to be taken into account for angles determined via acceleration sensors, because changes in velocity that are difficult to record, which occur, for example, during travel over potholes cannot be eliminated from the measurement signals.

In the embodiment described here, an inclination filter or position filter based on quaternions is used as filter algorithm. It is equally possible to employ a Kalman filter for merging the two methods of calculation. In this way, the two above-mentioned methods of calculation are combined, as a result of which a signal that can be used at both low frequencies and high frequencies is provided.

A quaternion is a four-dimensional vector $\vec{q} = [q_1, q_2, q_3, q_4]^T$, via which the orientation of a rigid body—in this case, the body of the vehicle body 6—is to be described. If a rigid body is rotated in relation to a reference system by the angle $\chi$ around the axis $\vec{r} = [r_x, r_y, r_z]^T$, wherein $\vec{r}$ is a unit vector, then this orientation is defined in relation to the reference system by the quaternion $\vec{q} = $ $$\left[\cos\frac{\chi}{2}, -r_x\sin\frac{\chi}{2}, -r_y\sin\frac{\chi}{2}, -r_z\sin\frac{\chi}{2}\right]^T.$$

This is utilized, first of all, for the time integration of the rates of rotation $\vec{\omega}$ measured by the sensor arrangement, wherein the vehicle body 6 is rotated in relation to the inertial reference system at, in the present case, the rate of rotation $\vec{\omega} = [\omega_x, \omega_y, \omega_z]^T$. Starting from an initial position $\vec{q}_L$ of the vehicle body 6, the change in the position or inclination on account of the rates of rotation is defined by Equation (7):

$$\vec{\dot{q}}_\omega = \tfrac{1}{2}\vec{q}_L \otimes [0,\omega_x,\omega_y,\omega_z] \quad (7)$$

Here, the operator $\otimes$ symbolizes a quaternion multiplication. In a time-discrete case, it is necessary to solve a resulting differential equation, for example, by an Euler integration (8):

$$\vec{q}_{\omega,k} = \vec{q}_{L,k-1} + \vec{\dot{q}}_\omega \Delta t \quad (8)$$

wherein $\Delta t$ corresponds to a step width between two points in time k and k−1.

In order to define an orientation of the vehicle body 6 from the acceleration a measured by the sensor arrangement and the resulting, adjusted gravitational acceleration $\overline{a_{gv}} = [a_{gv,x}, a_{gv,y}, a_{gv,z}]^T = [g^*\sin\theta, -g^*\sin\phi^*\cos\theta, -g^*\cos\phi^*\cos\theta]^T$ with quaternions, the following optimization problem (9) needs to be solved:

$$\vec{q}_a = \min_{q_L \in \mathbb{R}^4} \vec{f}(\vec{q}_L, \overline{a_{gv}}) \quad (9)$$

with $$\vec{f}(\vec{q}_L, \overline{a_{gv}}) = \begin{bmatrix} 2(q_{L,2}q_{a,4} - q_{L,1}q_{L,3}) - a_{gv,x} \\ 2(q_{L,1}q_{L,2} - q_{L,3}q_{L,4}) - a_{gv,y} \\ 2(0,5 - q_{L,2}^2 - q_{L,3}^2) - a_{gv,z} \end{bmatrix}$$

A direct calculation of the inclination is not possible, because an infinite number of solutions exist around an axis of rotation that is oriented parallel with respect to the gravitational vector. Used for time-discrete solution of the optimization problem is a gradient-based approach (10):

$$\vec{q}_{a,k} = \overrightarrow{q_{L,k-1}} - \mu \frac{\nabla \vec{f}(\overrightarrow{q_{L,k-1}}, \vec{a}_{gv})}{\|\nabla \vec{f}(\overrightarrow{q_{L,k-1}}, \vec{a}_{gv})\|} \quad (10)$$

with an adjustable step width $\mu$.

In order to merge information about the inclination that results from the measured rates of rotation $\vec{q}_{\omega,k}$ and from the accelerations $\vec{q}_{a,k}$, the two quaternions $\vec{q}_{a,k}$, $\vec{q}_{L,k}$ are added in a weighted manner by Equation (11):

$$\vec{q}_{L,k} = \gamma \vec{q}_{a,k} + (1-\gamma)\vec{q}_{\omega,k} \quad (11)$$

where $0 \leq \gamma \leq 1$ is an adjustable parameter. The angle of pitch and the angle of roll are then calculated with Equations (12a), (12b):

$$\theta_{a,k} = -\sin^{-1}(2q_{L,k,2}q_{L,k,4} + q_{L,k,1}q_{L,k,3}) \quad (12a)$$

$$\phi_{a,k} = \operatorname{atan}\left(\frac{2q_{L,k,3}q_{L,k,4} - 2q_{L,k,1}q_{L,k,2}}{2q_{L,k,1}^2 + 2q_{L,k,4}^2 - 1}\right) \quad (12b)$$

For elimination of the centrifugal acceleration $\vec{a}_{zf}$ and the change $\vec{a}_{vp}$ in the planar velocity $\vec{v}_{plane}$ from the accelerations measured by the sensor arrangement, the angles of pitch and the angles of roll are to be taken into account, which, in turn, are calculated by use of the gravitational acceleration vector $\vec{a}_{gv}$.

For implementation of the embodiment of the method, a so-called strapdown approach is used, which is illustrated in the diagram in FIG. 2. Individual steps 40, 42, 44, 46, 48 of the method will be described below in detail.

At the start of the method, values of the acceleration $\vec{a}$ and the rate of rotation $\vec{\omega}$ determined by sensor are provided. These values are used in a first step 40 to carry out a "correction of the centrifugal force," wherein the accelerations measured by the sensor arrangement are corrected by the contribution of the centrifugal force $\vec{a}_{zf} = \vec{\omega} \times \vec{v}_{plane}$. In this case, a first corrected acceleration $\vec{a} - \vec{a}_{zf}$ is determined. This first corrected acceleration $\vec{a} - \vec{a}_{zf}$ is corrected, taking into consideration values for the angle of roll $\phi_a$ and the angle of pitch $\theta_a$, in a second step 42 with implementation of a "correction of the force of gravity" by use of the gravitational acceleration as a result of which the acceleration in the horizontal plane is obtained.

In the scope of the method, two possibilities for calculating the planar velocity $\vec{v}_{plane}$ are provided.

A "determination of the velocities" is carried out in a third step 44 taking into consideration the acceleration $\vec{a}_{vp}$ of the vehicle 2, the measured velocity v of the vehicle 2, and the steering angle $\delta_{steer}$ thereof, wherein the first planar velocity of the vehicle $\vec{v}_{Int}$, $[v_{Int,x}, v_{Int,y}, v_{Int,z}]^T$ is determined by integration (13):

$$\vec{v}_{Int} = \int \vec{a}_{vp} dt \quad (13)$$

and the acceleration $\vec{a}_{vp}$ the vehicle 2 is calculated and accordingly determined. This planar velocity $\vec{v}_{Int}$ is used, in turn, in a closed control loop for "correction of the centrifugal force" in the first step 40.

For the velocity $v_{plane,x}$ in the spatial direction of a longitudinal axis of the vehicle 2, the velocity $v_{Vehicle}$, measured via the rotational speeds of the wheels in the direction $x_a$ of the vehicle 2, is available. By further using a single-lane model, it is further possible to calculate an effective velocity $v_{y,ESM}$ in relation to the lateral axis of the vehicle from the steering angle $\delta_{steer}$ and the measured velocity $v_{Vehicle}$. For the vertical velocity $v_{plane,z}$, no further methods of measurement or calculation are available. The alternatively determined second planar velocity of the vehicle (14):

$$\vec{v}_{alt} = [v_{Vehicle}, v_{y,ESM}, 0]^T \quad (14)$$

and the velocity $\vec{v}_{Int}$ calculated by integration (13) can be merged by a suitable filter algorithm, such as, for example, by a Kalman filter (15), via a calculation procedure that comprises a weighting factor $\tau$:

$$\vec{v}_{plane} = \tau \vec{v}_{Int} + (1-\tau)\vec{v}_{alt} \text{ with } 0 \leq \tau \leq 1 \quad (15)$$

In a fourth step 46 for the "correction of the planar velocity change," values of the measured velocity $v_{Vehicle}$, the steering angles $\delta_{steer}$, the angle $\theta_a$, $\phi_a$, and the acceleration $\vec{a} - \vec{a}_{zf}$, corrected by the centrifugal acceleration $\vec{a}_{zf}$, are taken into account, wherein the corrected acceleration is corrected by the contribution of the change in the planar velocity $\vec{a}_{vp,alt} = R\dot{\vec{v}}_{alt}$. In order to prevent a negative feedback, the derivative of a vector of the velocity $\vec{v}_{alt}$ is used instead of the velocity $\vec{v}_{plane}$ determined in accordance with the calculation procedure (15).

In a fifth step 48, taking into consideration the rate of rotation $\vec{\omega}$ and the gravitational acceleration $\vec{a}_{gv}$ of the vehicle 2, the angle of pitch $\theta_a$ as well as the angle of roll $\phi_a$ and accordingly the inclination or position of the vehicle body 6 of the vehicle 2 are calculated by using the above-described inclination filter based on quaternions. Via the above-described procedure, the angle of pitch $\theta_a$ and the angle of roll $\phi_a$ are determined in relation to the inertial coordinate system 28 and used in a closed control loop for the "correction of the force of gravity" in the second step 42 as well as for the "correction of the planar velocity change" in the third step 44.

Starting from the inclination of the vehicle body 6 determined in the fifth step 48, the inclination and accordingly the position of the roadway 4 are determined, wherein the distances $\vec{dz}_a = [dz_{a,VL}, dz_{a,VR}, dz_{a,HL}, dz_{a,HR}]^T$ between the wheels 8, 10 and the vehicle body 6 are employed as measured variables, as a result of which, first of all, the angle of pitch $\theta_f$ and the angle of roll $\phi_f$ of the chassis of the vehicle 2 are calculated, wherein a calculation to be carried out depends on a transformation matrix (16):

$$T = \begin{bmatrix} l_v & l_v & -l_h & -l_h \\ t_v & -t_v & t_h & -t_h \end{bmatrix} \quad (16)$$

where a geometric position of the center of gravity 25 will be or is defined in relation to the positions of the wheels 8, 10. In this case, the first column gives the distance of the front left wheel 8, the second column gives the distance of the front right wheel, the third column gives the distance of the rear left wheel 10, and the fourth column gives the distance of the rear right wheel from the center of gravity 25 within the horizontal plane.

The inclination of the chassis is then determined via the vectorial relation (17):

$$\begin{bmatrix} \phi_f \\ \theta_f \end{bmatrix} = T \vec{dz_a} \tag{17}$$

By subtraction of the inclination of the chassis from the inclination of the vehicle body 6, the inclination of the roadway 4 in relation to the first coordinate system 24 fixed to the vehicle body is calculated via the vectorial relation (18):

$$\begin{bmatrix} \phi_s \\ \theta_s \end{bmatrix} = \begin{bmatrix} \Phi_a \\ \theta_a \end{bmatrix} - \begin{bmatrix} \phi_f \\ \theta_f \end{bmatrix} \tag{18}$$

Because any deflection of the wheels 8, 10 is very small in comparison to the distance that is to be taken into account, said wheel deflection is ignored in the above calculation.

Because the angles $\phi_a$ and $\theta_a$ are estimated values for the inclination of the vehicle body 6 in relation to the vector and $\phi_f$ and $\theta_f$ define the relative angle between the vehicle body 6 and the surface of the roadway 4, $\phi_s$ and $\theta_s$ also provide angles as estimated variables for the inclination of the roadway 4 or street in relation to the gravitational vector.

For implementation of the method, a compensation of the inclination of the roadway 4 is to be applied to the active chassis of the vehicle 2 by correction of an inclination of the vehicle body 6 and, subsequently, the vehicle body 6 is to be aligned with the horizon or horizontally.

In this regard, it is to be predetermined on the basis of target values for a change in length of the actuators 12, 14 to what extent such a compensation of the inclination or a horizontal leveling of the vehicle body is to be done. In this way, through adjustment of respective lengths of the actuators 12, 14 to the target values during upward slope travel or uphill travel, a stronger horizontal leveling is to be provided in qualitative terms than for downward slope or downhill travel.

In the case of upward slope travel, the vehicle body 6 of the vehicle 2 is raised at the rear and lowered at the front, as a result of which a view of the occupants is to be improved and a comfort is to be increased. In the case of downward slope travel, the vehicle body 6 is raised at the front and lowered at the rear, although, in this case, in comparison to upward slope travel, a substantially lesser compensation of the inclination is to be done in order not to worsen the view of the occupants and in order to ensure a ground clearance of the vehicle body 6 during a transition from downward slope travel or downhill travel to the horizontal.

It is also conceivable to align the vehicle body 6 horizontally laterally to the direction of travel of the vehicle 2, wherein a compensation of the inclination of the vehicle body 6 in the lateral direction can also be limited by specifying target values in order to avoid driving situations in which, for example, a ground clearance might be limited.

For implementation of the method, the calculated angle of inclination of the roadway $\phi_s$ and $\theta_s$ is limited, first of all, by specifying target or limit values $\phi_{s,lim}$, $\theta_{s,lim}$:

$$\phi_{s,lim} = \begin{cases} \phi_{s,max} & \text{if } \phi_s > \phi_{s,max} \\ \phi_{s,min} & \text{if } \phi_s < \phi_{s,min} \\ \text{otherwise } \phi_s \end{cases} \tag{19}$$

$$\theta_{s,lim} = \begin{cases} \theta_{s,max} & \text{if } \theta_s > \theta_{s,max} \\ \theta_{s,min} & \text{if } \theta_s < \theta_{s,min} \\ \text{otherwise } \theta_s \end{cases} \tag{20}$$

Afterwards, the angles of inclination $\phi_s$, $\theta_s$ are converted to target values $\vec{z_{act}} = [z_{act,VL}, z_{act,VR}, z_{act,HL}, z_{act,HR}]^T$ for the change in length of the actuators 12, 14 of the active chassis. A conversion of the limited angle of pitch and angle of roll of the roadway 4 to the target values for lengths of the actuators 12, 14 is carried out by use of the transformation matrix T and by way of known translation ratios between actuator-related and wheel-related distances, $i_{VA}=$ $$\frac{z_{act,VL}}{dz_{a,VL}} = \frac{z_{act,VR}}{dz_{a,VR}}$$

and $$i_{HA} = \frac{z_{act,HL}}{dz_{a,HL}} = \frac{z_{act,HR}}{dz_{a,HR}}$$

for the front axle and the rear axle of the vehicle 2, as a result of which a diagonal matrix $\text{diag}(i_{VA}, i_{VA}, i_{HA}, i_{HA})$ is formed. In this case, the following relation with the transposed transformation matrix (16) is used for the actuator-related target values:

$$\vec{z_{act}} = \text{diag}(i_{VA}, i_{VA}, i_{HA}, i_{HA})^T \begin{bmatrix} \phi_{s,lim} \\ \theta_{s,lim} \end{bmatrix} \tag{21}$$

In the above formulas, the maximum or minimum angles $\phi_{s,max}$, $\theta_{s,max}$, $\phi_{s,min}$, and $\theta_{s,min}$ are adjustable matching parameters or target values, which can be varied depending on the driving situation in each case.

In an applied example, the following initial values are predetermined:

$$i_{VA} = i_{HA} = 1;\ t_v = t_h = 0{,}5;\ l_v = l_h = 1{,}5 \tag{22}$$

$$\phi_{s,lim} = 1/180\pi;\ \theta_{s,lim} = 0 \tag{23}$$

There results from this:

$$\vec{z_{act}} = [0{,}026\ 0{,}026\ -0{,}026\ -0{,}026]^T \tag{24}$$

This means that the front actuators 12 are moved 2.6 cm upwards and the rear actuators 14 are moved 2.6 cm downwards, wherein lengths of the respective actuators 12, 14 can be varied in accordance with the lengths given here.

Figure 3:
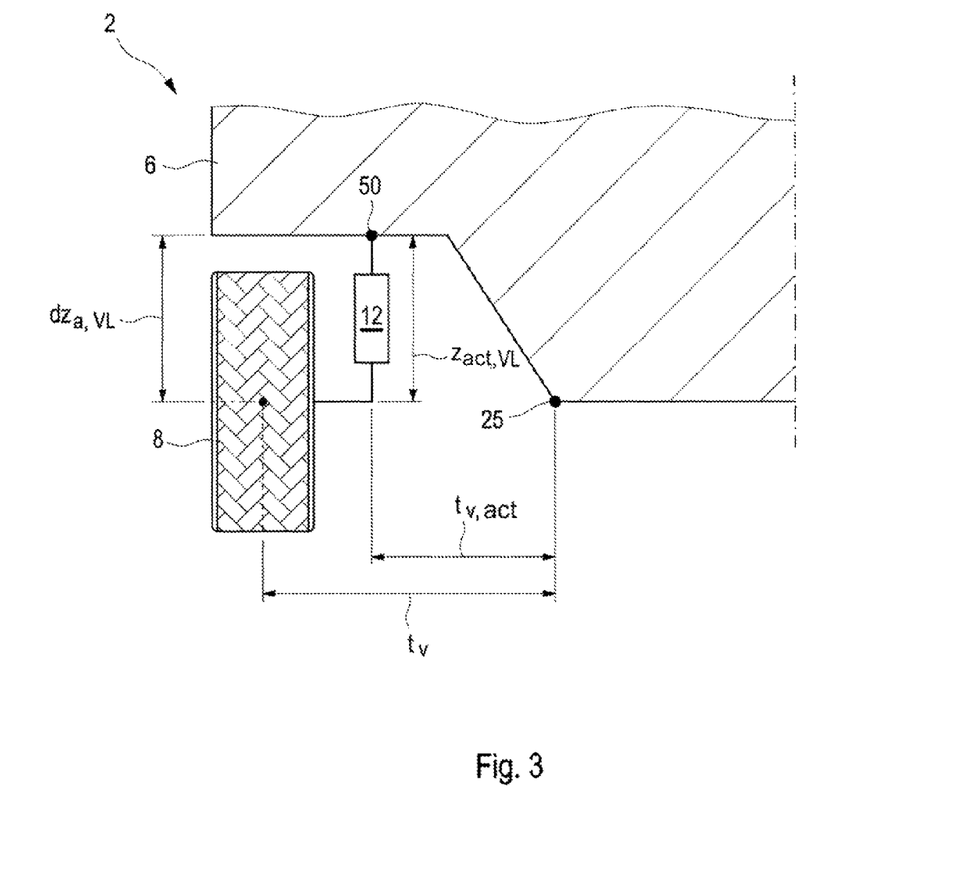
FIG. 3 shows, in schematic illustration, a detail of the vehicle from FIG. 1.

FIG. 3 shows, in schematic illustration, a detail of the vehicle 2 in the area of the wheel 8 arranged at the front left, which, in this case, is joined via the actuator 12 associated with this wheel 8 at a suspension point 50 of the vehicle body 6 of the vehicle 2. Moreover, FIG. 3 shows the transverse distance $t_v$ of the wheel 8 from the center of gravity 25. Here, too, a transverse distance $t_{v,act}$ of the actuator 12 from the center of gravity 25 is indicated by a double arrow. A distance $dz_{a,VL}$ of the wheel 8 to the vehicle body 6 as well as a distance $z_{act,VL}$ of the actuator 12 from the suspension point 50 of the vehicle body 6 are also illustrated here.

Accordingly, for the rear left wheel 10, the distance $dz_{a,HL}$ thereof to the vehicle body as well as the distance thereof to from the center of gravity 25 are to be taken into account. For the actuator 14, which is associated with the rear left wheel 10, correspondingly a distance $z_{act,HL}$ to a suspension point of the vehicle body 6 as well as $t_{h,act}$ from the center of gravity 25 are to be taken into account.

Figure 4:
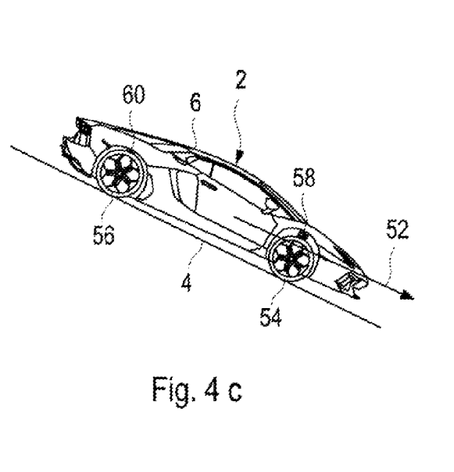
FIG. 4 shows the vehicle from FIG. 1 for different variants of the embodiment of the method according to the invention.

In FIG. 4a, the vehicle 2 is illustrated schematically for upward slope travel on the roadway 4, in FIG. 4b in the horizontal plane of the roadway 4, and in FIG. 4c for downward slope travel, wherein in all three FIGS. 4a, 4b, 4c, a direction of travel of the vehicle 2 forwards is indicated by an arrow 52. Moreover, in FIGS. 4a, 4b and 4c, a front right wheel 54 of the vehicle 2 and a rear right wheel 56 of the vehicle 2 are illustrated. In this case, it is provided that the front right wheel 54 is joined via an actuator 58 at a suspension point of the vehicle body 6 of the vehicle 2, whereas the rear right wheel 56 is joined via an actuator 60 at a suspension point of the vehicle body 6.

With reference to the illustration of FIG. 1 and/or FIG. 3, the front right wheel 54 exhibits the distance $dz_{a,VR}$ to the vehicle body 6 and the distance $t_v$ from the center of gravity 25. The actuator 58 associated with the front right wheel 54 exhibits a distance $z_{act,VR}$ to the vehicle body 6 and a distance $t_{v,act}$ from the center of gravity 25 of the vehicle body. Accordingly, the rear right wheel 56 exhibits the distance $dz_{a,HR}$ to the suspension point of the vehicle body 6 and the distance to from the center of gravity 25. The actuator 60 associated with the rear right wheel 56 exhibits a distance $z_{act,HR}$ to a suspension point of the vehicle body 6 and a distance $t_{h,act}$ from the center of gravity 25 of the vehicle body 6.

Taking into consideration the above-described steps of the method according to the invention, the actuators 14, 60, which join the rear wheels 10, 56 at the rear axle of the vehicle 2 to the vehicle body 6 thereof, are lengthened by a greater distance for upward slope travel (FIG. 4a) in comparison to the two actuators 12, 58, which join the front wheels 8, 54 at the front axle of the vehicle 2 to the vehicle body 6 thereof. During a drive on a horizontally oriented roadway (FIG. 4b), the lengths of the actuators 12, 14, 58, 60 are adjusted to be equal in length. For downward slope travel, which is indicated on the basis of FIG. 4c, the actuators 12, 58, which join the two front wheels 8, 54 to the vehicle body 6 of the vehicle 2, are lengthened by a greater distance than the actuators 14, 60, which join the wheels 10, 56 of the rear axle of the vehicle 2 to the vehicle body 6 thereof. However, the lengthening of the actuators 12, 58 at the front axle in comparison to the actuators 14, 60 at the rear axle in the case of downward slope travel is less than the lengthening of the actuators 14, 60 in comparison to the actuators 12, 58 in the case of upward slope travel.

The invention claimed is:

1. A method for compensating for an inclination of a vehicle in at least one spatial direction, comprising:
wherein the vehicle has a vehicle body and an active chassis with a plurality of wheels, which are in contact with the roadway;
wherein each wheel is joined to the vehicle body by an actuator, which can be adjusted in terms of its length, at a suspension point associated with the wheel;
wherein an inclination of the vehicle body in the at least one spatial direction is determined, wherein, for at least two wheels, a respective vertical distance to the suspension point of the vehicle body associated with the particular wheel is detected;
wherein, via the at least two determined distances, an inclination of the chassis in the at least one spatial direction is calculated by transformation of the vertical distance of the at least two wheels to the vehicle body by using a transformation matrix $$T = \begin{bmatrix} l_v & l_v & -l_h & -l_h \\ t_v & -t_v & t_h & -t_h \end{bmatrix}$$

wherein the inclination of the roadway in the at least one spatial direction is determined from a difference of the inclination of the vehicle body in the at least one spatial direction and the inclination of the chassis in the at least one spatial direction;
wherein a value for at least one angle $\phi_s$, $\theta_s$, respectively, by which the roadway is inclined in the at least one spatial direction, is determined,
wherein a limit value $\phi_{s,lim}$, $\theta_{s,lim}$, respectively, for the value of the at least one angle $\phi_s$, $\theta_s$ is predetermined;
wherein translation ratios $i_{VA}$, $i_{HA}$ for a distance of the at least one actuator in relation to the vehicle body and for a distance of the at least one wheel in relation to the vehicle body are taken into account;
wherein a target value for a change in the length of the at least one actuator is determined by:

$$\vec{z_{act}} = \text{diag}(i_{VA}, i_{VA}, i_{HA}, i_{HA}) T^T \begin{bmatrix} \phi_{s,lim} \\ \theta_{s,lim} \end{bmatrix}.$$

2. The method according to claim 1, wherein the inclination of the chassis in the at least one spatial direction is determined by transformation of the vertical distances of the at least two wheels from a center of gravity of the vehicle body by using the transformation matrix $$T = \begin{bmatrix} l_v & l_v & -l_h & -l_h \\ t_v & -t_v & t_h & -t_h \end{bmatrix}$$

wherein a front, longitudinal length $l_v$ defines a distance of a particular front wheel from a center of gravity of the vehicle body in the longitudinal spatial direction; a rear, longitudinal length $l_h$ defines the distance of a particular rear wheel from the center of gravity in the longitudinal spatial direction; a front, transverse length $t_v$ defines the distance of the front wheel from the center of gravity in the transverse spatial direction; and a rear, transverse distance to defines the distance of the rear wheel from the center of gravity in the transverse spatial direction.

3. The method according to claim 2, wherein the translation ratios $i_{VA}$, $i_{HA}$ are calculated by way of a distance of an actuator from the center of gravity of the vehicle body in each case, and of a wheel from the center of gravity of the vehicle body in each case.

4. The method according to claim 1, wherein, in the presence of an upward slope travel, a negative angle of pitch $\theta_s$ is determined, and, in the presence of downward slope travel, a positive angle of pitch $\theta_s$ is determined.

5. The method according to claim 1, wherein the respective limit value $\phi_{s,lim}$, $\theta_{s,lim}$ for the value of the at least one angle $\phi_s$, $\theta_s$ is predetermined by:

$$\phi_{s,lim} = \begin{cases} \phi_{s,max} & \text{if } \phi_s > \phi_{s,max} \\ \phi_{s,min} & \text{if } \phi_s < \phi_{s,min} \\ \text{otherwise } \phi_s \end{cases}$$

$$\theta_{s,lim} = \begin{cases} \theta_{s,max} & \text{if } \theta_s > \theta_{s,max} \\ \theta_{s,min} & \text{if } \theta_s < \theta_{s,min} \\ \text{otherwise } \theta_s \end{cases}$$

6. The method according to claim 5, wherein a value of $\theta_{s,min}$ in the case of upward slope travel is chosen to be greater than a value of $\theta_{s,max}$ in the case of downward slope travel.

7. The method according to claim 1, wherein, for the determination of the inclination of the vehicle body, a first, coordinate system that is fixed relative to the vehicle body is used, and, for the determination of the inclination of the chassis, a second chassis-fixed coordinate system is used, and wherein a third, inertial coordinate system is used as reference coordinate system, which is established in relation to the force of gravity.

8. The method according to claim 7, wherein the inclination of the vehicle body in relation to the reference coordinate system is described via a quaternion.

9. The method according to claim 1, wherein a strapdown algorithm is used, with which it is provided that, for the determination of a corrected acceleration of the vehicle, an acceleration measured by sensor is corrected by a centrifugal acceleration and by the gravitational acceleration and, from this, a velocity of the vehicle on a planar surface is determined, and that the inclination of the vehicle body is calculated.

10. A system for compensating for an inclination of a vehicle in at least one spatial direction, wherein the vehicle has a vehicle body and an active chassis with a plurality of wheels, which are in contact with the roadway, wherein the system has a plurality of sensors and a control unit;

wherein each wheel is joined to the vehicle body by way of an actuator, which can be adjusted in terms of its length, at a suspension point associated with the wheel;

wherein at least a first sensor is designed for the purpose of determining an inclination of the vehicle body in the at least one spatial direction, wherein at least one second sensor is designed to record, for at least two wheels, respectively, a vertical distance to the suspension point of the vehicle body associated with the particular wheel, wherein the control unit is designed for the purpose of calculating, via at least two determined distances of the at least two wheels, an inclination of the chassis in the at least one spatial direction by transformation of the vertical distance of the at least two wheels to the vehicle body by using a transformation matrix $$T = \begin{bmatrix} l_v & l_v & -l_h & -l_h \\ t_v & -t_v & t_h & -t_h \end{bmatrix}$$

wherein the control unit is designed for the purpose of determining the inclination of the roadway in the at least one spatial direction from a difference in the inclination of the vehicle body in the at least one spatial direction and the inclination of the chassis in the at least one spatial direction, and a value for at least one angle $\phi_s$, $\theta_s$, respectively, by which the roadway is inclined in the at least one spatial direction;

wherein a limit value $\phi_{s,lim}$, $\theta_{s,lim}$, respectively, for the value of the at least one angle $\phi_s$, $\theta_s$ is predetermined;

wherein the control unit is designed for the purpose of taking into account the translation ratios $i_{VA}$, $i_{HA}$ for a distance of the at least one actuator in relation to the vehicle body and for a distance of the at least one wheel in relation to the vehicle body;

wherein the control unit is designed for the purpose of determining a target value for a change in a length of the at least one actuator by:

$$\vec{z}_{act} = \text{diag}(i_{VA}, i_{VA}, i_{HA}, i_{HA})T^T \begin{bmatrix} \phi_{s,lim} \\ \theta_{s,lim} \end{bmatrix}.$$

11. The system according to claim 10, in which the at least one second sensor is designed as a distance sensor.

* * * * *